Dec. 24, 1929. J. O. CARREY 1,740,682
SHAFT SEAL
Filed July 3, 1926
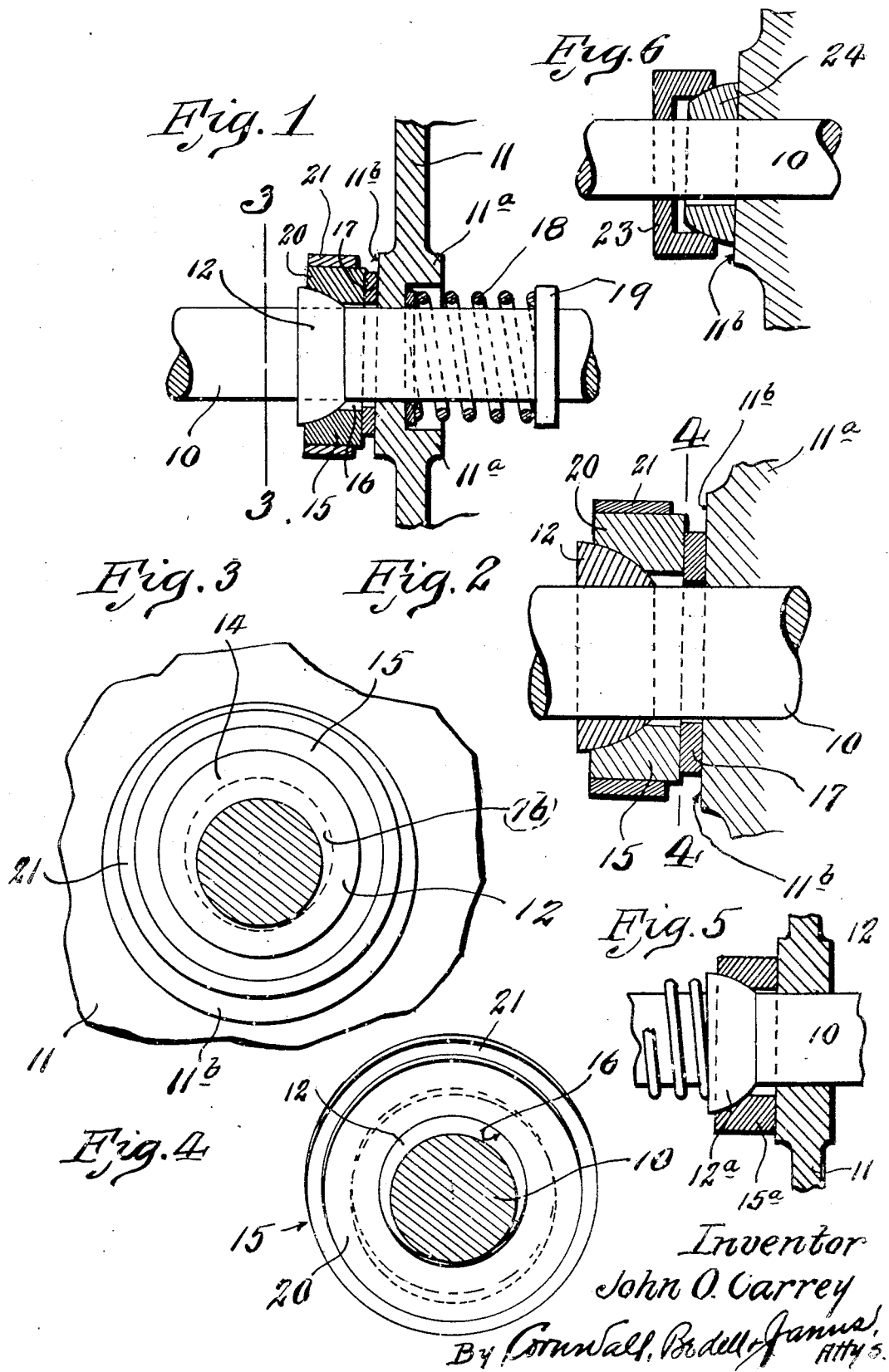

Patented Dec. 24, 1929

1,740,682

UNITED STATES PATENT OFFICE

JOHN O. CARREY, OF ST. LOUIS, MISSOURI, ASSIGNOR TO C. & C. ENGINEERING CO., INC., OF ST. LOUIS, MISSOURI, A CORPORATION OF MISSOURI

SHAFT SEAL

Application filed July 3, 1926. Serial No. 120,463.

This invention relates to new and useful improvements in shaft seals, the objects of the invention being to provide a seal comprising two cooperating members, one of which is revoluble and is eccentrically disposed to cause the other member to shift its position laterally relative to the axis of rotation and at the same time impart to it revolving motion at differential speed whereby the cooperating surfaces of the two members are prevented from having a fixed relation with respect to each other and are subjected to uniform wear throughout their interengaged surfaces.

Other objects of the invention are to provide a pair of cooperating seal members having ball and socket engagement, one of said members being revoluble and the other member being loosely mounted and angularly disposed with respect to the first member so as to cause said loose member to rock upon said revoluble member, thereby changing the position of the cooperating surfaces of said members.

Still other objects of the invention are to provide a convex member fixed to and eccentrically mounted on a revoluble shaft and a concave member loosely mounted on said shaft and movable laterally with respect thereto, said loose member being angularly disposed with respect to said convex member so as to receive rocking motion and circular motion with respect to said revoluble member and thus prevent a fixed line of contact between the interengaged convex and concave surfaces of said members.

With these and other objects in view, my invention consists in certain novel features of construction and arrangement of parts, hereinafter more fully described and claimed, and illustrated in the accompanying drawings, in which—

Figure 1 is a longitudinal cross section through a portion of the casing equipped with my shaft seal.

Figure 2 is an enlarged detail section of the seal.

Figure 3 is a section taken on line 3—3 of Figure 1.

Figure 4 is a transverse section taken on line 4—4 of Figure 2.

Figure 5 is a detail section of a modified form of my improved seal.

Figure 6 is a detail section of still another modified form of my invention.

Referring by numerals to the accompanying drawings, 10 indicates a shaft which extends through a shaft opening formed in the housing which it is desired to be sealed, such as a wall portion 11. A convex member 12 is fixed to shaft 10 and is eccentrically mounted relative thereto as indicated at 14 in Figure 3. This revoluble member has a bearing in a concave member 15 which is provided with a central opening 16 of larger diameter than the diameter of shaft 10 so as to permit lateral movement of member 15 with respect to said shaft 10.

Wall 11 is provided with a boss $11^a$, the outer face $11^b$ of which is inclined from vertical, and interposed between face $11^b$ and corresponding face of member 15 is a washer 17 which is of uniform thickness whereby member 16 is caused to occupy angular position with respect to member 12. The cooperating faces of members 12 and 15 are held in engagement with each other under pressure and preferably by means of a coiled spring 18, which, in the present instance, is shown as having one end bearing against boss $11^a$ and its opposite end against the collar 19 which is fixed to shaft 10 in spaced relation with said boss. In this manner, spring 18 exerts pressure against shaft 10 in axial direction and thereby forces the convex face of member 12 in sealing contact with the concave face of member 15. As the member 12 is rotated, member 15, due to the frictional interengagement therebetween, is caused to rotate also but the speed of said member 15 is not uniform with the speed of member 12 due to the friction between said members and between member 15 and washer 17, thereby causing said member 15 to lag behind member 12 so that the points of contact between said members 12 and 15 are constantly changing.

During the rotation, the member 15 is caused simultaneously to rock on member 12 due to the angularly disposed face 11ᵇ of boss 11ᵃ, thereby preventing member 12 from having a fixed line contact with member 15 and eliminating formation of circular grooves in the cooperating faces of said members as well as between the cooperating faces of member 15 and boss 11ᵃ. In this manner, the interengaged surfaces have imparted thereto lapping motion and are maintained perfectly smooth at all times and in proper sealing contact with each other.

In the form shown in Figure 1 to 4, member 15 is shown as formed of a special metal alloy 20 disposed within the ring 21, for reducing the friction between members 12 and 15.

In Figure 5 are shown members 12ᵃ and 15ᵃ both formed of special steel treated so as to withstand a great deal of wear. The eccentricity of member 12ᵃ, which is fixedly mounted on a revoluble shaft, causes lateral movement of member 15ᵃ with respect to the axis of rotation, opening 16ᵃ being formed large enough to allow for this lateral movement and the face 11ᵇ disposed angularly with respect to member 12ᵃ enables rocking movement of member 15ᵃ relative to said member 12ᵃ thereby providing lapping motion between the cooperating surfaces, thus insuring uniform wear of the cooperating faces of members 12ᵃ and 15ᵃ at all times.

In Figure 6 is shown a modified form wherein the concave member 23 is eccentrically and fixedly mounted on shaft 10 and the convex member 24 is loosely arranged on said shaft and is inclined from vertical by virtue of well 11ᵇ against which said member 24 bears. The operation is the same as in the previous forms, the angularly disposed member causing wiping contact between the two seal members and the eccentricity of the other member producing relative movements between said members so as to eliminate a fixed relation between the cooperating faces thereof.

The constant changing of the two members with respect to each other eliminates undue wear and preserves a perfect sealing contact between the surfaces. This wiping action permits also an efficient lubrication of the cooperating surfaces, as the changing or shifting of one member with respect to the other allows the lubricant to wash the surfaces of the members.

A seal shaft of my improved construction is simple in construction, is highly efficient in operation, and will remain in operative condition for a long time, due to the particular construction, the seal members are subject to very little wear.

It is obvious that minor changes in the construction and arrangements of the parts of my improved seal can be made and substituted for those herein shown without departing from the spirit of my invention.

I claim:

1. A shaft seal comprising a revoluble member having a horizontally disposed axis and a loose member, said members having concavo-convex surface contact with each other to form a seal, said loose member being inclined from vertical, thereby causing it to rock with respect to said revoluble member to insure uniform wear of the cooperating sealing faces of said members.

2. A shaft seal comprising in combination a revoluble member having a fixed axis, and a loose member, said members having a ball and socket joint with each other, and said revoluble member being eccentrically mounted to cause said loose member to move laterally with respect to the axis of rotation.

3. A shaft seal comprising a revoluble member adapted to be fixed to a shaft, a loose member held in pressure contact with said revoluble member, said revoluble member being eccentrically disposed relative to said shaft and said loose member being provided with an enlarged shaft opening to allow lateral movement of said loose member with respect to said shaft, said loose member being inclined from the perpindicular to receive an eccentric and rocking motion so as to continually change the line of contact between the surfaces of said members.

4. In a device of the class described, the combination with a revoluble shaft, of a member fixed therto in eccentric relation therewith, a loose member arranged on said shaft and having cooperating sealing contact with said fixed member, said loose member being provided with an enlarged shaft opening to permit movement of said loose member laterally of said shaft, a fixed wall arranged adjacent to said loose member and inclined from vertical, whereby said loose member has imparted thereto rocking motion, thereby constantly changing the line of contact of the cooperating surfaces of said members.

5. In a device of the class described, the combination with a revoluble shaft, of a revoluble member fixed thereto and provided with a convex face, a ring loosely mounted on said shaft and provided with a concave face for receiving said convex face of said revoluble member, a fixed wall member cooperating in plane surface contact with said loose member, said surface being inclined with respect to the plane of rotation of said revoluble member to cause said loose member to receive lapping motion relative to said revoluble member, and a spring bearing against said shaft for maintaining the cooperating convex and concave faces of said members in sealing contact with each other.

6. In a device of the class described, the combination with a horizontally disposed revoluble shaft, of a convex member eccentrically fixed on said shaft, a concave member loosely arranged on said shaft and in sealing contact with said convex member, a fixed wall member arranged adjacent to said concave member and having a plane surface contact therewith said plane surface being inclined from vertical, the eccentricity of the convex member producing lateral movement of the concave member and the inclination of said concave member causing rocking movement thereof with respect to said convex member.

7. A shaft seal comprising a revoluble shaft, an eccentric member fixed to said shaft and revoluble therewith, a fixed wall member having an opening through which said shaft projects outwardly, and a floating member disposed on said shaft between said eccentric member and said fixed member and having lapping sealing surface contact with said members.

8. A shaft seal comprising a revoluble shaft, an eccentric member fixed on said shaft and revoluble therewith, a fixed wall member having an opening through which said shaft projects outwardly, and a floating member disposed on said shaft between said eccentric member and said fixed wall member, said eccentric member and said floating member having concavo-convex lapping surface contact with each other and said floating member having a plane surface lapping contact with said wall member.

9. A shaft seal comprising a revoluble shaft, an eccentric member fixed on said shaft and revoluble therewith, a fixed wall member having an opening through which said shaft projects outwardly, a floating member disposed on said shaft between said eccentric member and said fixed wall member, said eccentric member and said floating member having concavo-convex lapping surface contact with each other and said floating member having a plane surface lapping contact with said wall member, and means for maintaining said floating member out of parallelism with said eccentric member and imparting to said floating member a lapping oscillatory movement.

10. A shaft seal comprising a revoluble shaft, an eccentric member fixed to said shaft and revoluble therewith, a fixed wall member having an opening though which said shaft projects outwardly, a floating member disposed on said shaft between said eccentric member and said fixed member and having lapping sealing surface contact with said members, and means for yieldingly holding said members in sealing pressure contact with each other.

11. A shaft seal comprising a revoluble shaft, an eccentric member fixed on said shaft and revoluble therewith, a fixed wall member having an opening through which said shaft projects outwardly, a floating member disposed on said shaft between said eccentric member and said fixed wall member and operable by said eccentric member to gyrate transversely of said shaft, said eccentric member and said floating member having concavo-convex lapping surface contact with each other and said floating member having a plane surface lapping contact with said wall member, means for maintaining said floating member out of parallelism with said eccentric member and imparting to said floating member a lapping oscillatory movement relative to said eccentric member, and resilient means for maintaining said members in sealing pressure contact with each other.

12. A shaft seal comprising in combination with a housing to be sealed, a revoluble shaft extending outwardly therefrom, an eccentric member fixed to said shaft, a floating member loosely arranged on said shaft and having a ball and socket sealing contact with said eccentric member and having a plane surface contact with the adjacent face of said housing, said floating member having imparted thereto by the eccentricity of the first member a gyratory motion with respect to the cooperating surfaces, and means for yieldingly holding said floating member in sealing contact with said cooperating surfaces.

13. In a device of the class described, the combination with a housing to be sealed, of a revoluble shaft arranged therein and extending therefrom, an eccentric member fixed on said shaft, a floating member loosely arranged on said shaft between said eccentric member and the wall of said housing and operable by said eccentric to receive gyratory motion transversely of said shaft, and means for yieldingly maintaining said floating member in sealing contact with the adjacent surfaces of said eccentric member and the wall of said housing.

14 In a device of the class described, the combination with a closed housing, of a revoluble shaft extending outwardly through an opening formed in said housing, an eccentric member fixed on said shaft in spaced relation with the apertured wall of said housing, a floating member loosely arranged on said shaft between said eccentric member and said apertured wall and operable by said eccentric member to receive gyratory motion, and a spring for forcing said eccentric member toward said apertured wall to maintain a sealing contact between the cooperating surfaces of said members and said wall.

In testimony whereof I hereunto affix my signature this 16th day of June, 1926.

JOHN O. CARREY.